United States Patent
Waheed et al.

(10) Patent No.: US 9,106,485 B1
(45) Date of Patent: Aug. 11, 2015

(54) SYSTEM AND METHOD FOR FSK DEMODULATION

(71) Applicants: Khurram Waheed, Austin, TX (US); Sreenivasa M. Nerayanuru, Phoenix, AZ (US)

(72) Inventors: Khurram Waheed, Austin, TX (US); Sreenivasa M. Nerayanuru, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/193,189

(22) Filed: Feb. 28, 2014

(51) Int. Cl.
*H04L 27/10* (2006.01)
*H04L 27/14* (2006.01)
*H04W 4/00* (2009.01)

(52) U.S. Cl.
CPC .............. *H04L 27/10* (2013.01); *H04L 27/14* (2013.01); *H04W 4/008* (2013.01)

(58) Field of Classification Search
None
See application file for complete search history.

(56) References Cited

U.S. PATENT DOCUMENTS

| | | | | |
|---|---|---|---|---|
| 4,730,344 | A * | 3/1988 | Saha | 375/280 |
| 6,763,074 | B1 * | 7/2004 | Yang | 375/328 |
| 6,891,905 | B1 | 5/2005 | Malone et al. | |
| 7,397,300 | B2 | 7/2008 | Quinlan et al. | |
| 7,912,144 | B2 | 3/2011 | Dodgson et al. | |
| 8,324,962 | B2 | 12/2012 | Mulvaney | |
| 2006/0034352 | A1 * | 2/2006 | Sampath et al. | 375/148 |
| 2008/0112885 | A1 * | 5/2008 | Okunev et al. | 424/9.1 |
| 2010/0309959 | A1 | 12/2010 | Lakkis | |
| 2011/0099213 | A1 * | 4/2011 | Snelgrove | 708/3 |

OTHER PUBLICATIONS

Y. Iwanami and P.H. Wittke, "BER Analysis of Binary CP-FSK with Energy Detection and Sequence Estimation on Frequency Selective Multipath Channels", in IEEE Int'l conf on Communications, 1999. vol. 2, pp. 833-837.

* cited by examiner

*Primary Examiner* — Leon-Viet Nguyen
(74) *Attorney, Agent, or Firm* — Quarles & Brady LLP (57) ABSTRACT

A system and method for frequency-selective demodulation is presented. An input signal is received that is modulated by frequency shift keying (FSK) and encodes data at a first and second frequency. The input signal is supplied to a plurality of estimators that include a first estimator configured to detect a first signal at the first frequency, a second estimator configured to detect a second signal at the second frequency, a third estimator configured to detect a third signal at a third frequency, and a fourth estimator configured to detect a fourth signal at a fourth frequency. An output is generated indicating receipt of the data encoded at the first frequency or the second frequency based upon outputs of the first estimator, the second estimator, the third estimator, and the fourth estimator.

20 Claims, 7 Drawing Sheets

SYSTEM AND METHOD FOR FSK DEMODULATION

FIELD OF THE INVENTION

Embodiments of the inventive subject matter relate to the field of the demodulation of frequency modulated signals and more specifically to systems and methods for a frequency-selective demodulation of frequency modulated signals.

BACKGROUND OF THE INVENTION

When transmitting data from one device to another, either using a wired communication link or a wireless link, the data must be transformed into a suitable signal form for being transmitted via the communication link. In this case of wireless communications, this involves inserting the data to be transmitted onto a carrier signal that can then be transmitted using the wireless link. After the encoded data signal has been received by the second device, the signal is down-converted and the modulated data is "demodulated", i.e. removed from the carrier signal and converted into a suitable form for use.

Devices capable of communicating with other devices via a particular modulation technique each include a modulator and/or a demodulator, which is particularly designed for modulating/demodulating data according to the particular modulation technique. For example, a modem device may include both a modulator and a demodulator. The modulators and demodulators for different modulation techniques can differ considerably from each other.

More and more devices are designed to communicate with each other using various types of wireless communication techniques. The operation of these different wireless technologies is often governed by standards. Examples standards include those specifying the operation of IEEE 802.11 networks, and BLUETOOTH communication protocols.

In all demodulation techniques it is preferable to increase receiver sensitivity to improve demodulation capabilities. As sensitivity increases, signals having lower signal level magnitudes can be successfully received and decoded while meeting a required minimum packet error rate (PER) or bit error rate (BER) performance metric. These improvements may allow for lower-power transmitters to be utilized in a given application or increases in transmission rate between devices, or combinations thereof.

BRIEF DESCRIPTION OF THE DRAWINGS

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present inventive subject matter.

DETAILED DESCRIPTION

In overview, the present disclosure describes embodiments of the inventive subject matter that relate to the field of the demodulation of modulated signals and more specifically to systems and methods for frequency-selective demodulation of frequency modulated signals.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the scope of the invention.

It is further understood that the use of relational terms, if any, such as first and second, top and bottom, and the like are used solely to distinguish one entity or action from another without necessarily requiring or implying any actual such relationship or order between such entities or actions.

Much of the inventive functionality and many of the inventive principles are best implemented with or in integrated circuits (ICs) including possibly application specific ICs or ICs with integrated processing or control or other structures. It is expected that one of ordinary skill, notwithstanding possibly significant effort and many design choices motivated by, for example, available time, current technology, and economic considerations, when guided by the concepts and principles disclosed herein will be readily capable of generating such ICs and structures with minimal experimentation. Therefore, in the interest of brevity and minimization of any risk of obscuring the principles and concepts according to below-described embodiments of the present invention, further discussion of such structures and ICs, if any, will be limited to the essentials with respect to the principles and concepts of the various embodiments.

Figure 1:
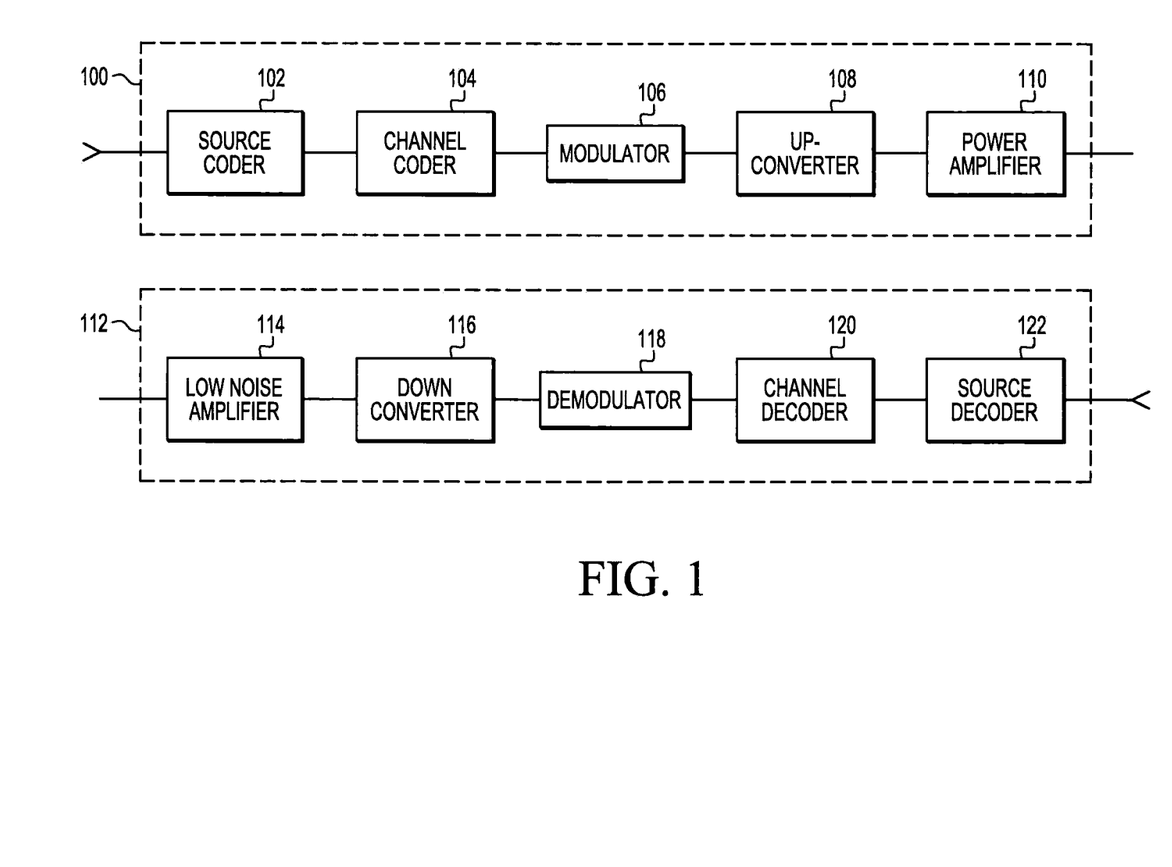
FIG. 1 depicts elements of a communication system.

Referring now to FIG. 1, elements typically used for communicating digital data between two devices are illustrated. In FIG. 1, transmitter 100 includes source coder 102, channel coder 104, modulator 106, up-converter 108, and power amplifier 110. Receiver 112 includes low noise amplifier 114, down-converter 116, demodulator 118, channel decoder 120, and source decoder 122.

In operation, the data to be transmitted is provided, in a suitable digital form, to source coder 102 (e.g. a voice codec, or an image codec). The output of source coder 102 is generally a binary data stream. Channel coder 104 process the data outputted by source coder 102 such that channel errors can be detected and/or corrected at the receiver. Commonly, this is achieved by channel coder 104 adding redundancy bits, which enables the receiver to detect and/or correct possible errors.

Modulator 106 transforms the data processed by channel coder 104 into an analog form suitable for transmission. Digital modulation can usually be divided into two parts: (1) digital processing of the incoming bit stream; and (2) converting the resulting processed data into an analog form, for transmission, for example, via a wireless medium.

In up-converter 108 the data is translated to the frequency in which bandwidth has been allocated for the transmission, and the output original strength is subsequently enhanced in power amplifier 110 such that the power is sufficient to transmit the data to the receiving device. The resultant signal can then be transmitted by supplying the signal to an antenna connected to power amplifier 110.

At receiver 112, the data received is received at an antenna connected to low noise amplifier 114. The received signal is then amplified by low noise amplifier 114. This amplification step can be useful as the data signal may have been attenuated through the transmission of the signal from one device to another. The received signal is therefore enhanced in low noise amplifier 114 such that it is at a level suitable for further handling by the following elements of the receiver 112.

Down converter 116 then moves the data signals from their allocated transmission bandwidth to a predetermined baseband. In demodulator 118, the process of modulation carried out in transmitter 100 is reversed to convert the received signal back into its original digital form.

In channel decoder 120, errors that occurred during transmission of the data via the transmission channel are detected and corrected. The output from channel decoder 120 is then brought into a form required by the point of reception in source decoder 122.

Modulation and demodulation schemes are often defined in standards associated with particular wireless communication technologies. In frequency modulation approaches, for examples, changes in the frequency of a transmitted signal are used to communication information. For transmissions made in accordance with the BLUETOOTH standard, techniques such as frequency shift keying (FSK) and Gaussian frequency shift keying (GFSK) are used to modulate and demodulate transmitted data signals.

In FSK, a particular carrier frequency may be defined. For example, the carrier frequency of BLUETOOTH communications (e.g., BLUETOOTH low energy transmission) may be around 2.4 gigahertz (GHz). A data value of '1' is then represented by the transmission of a signal (sometimes referred to as the mark signal) having a frequency that exceeds the carrier frequency by some amount ($f_m$). Conversely, a data value of '0' is represented by the transmission of a signal (sometimes referred to as the space signal) having a frequency that is less than the carrier frequency by some amount. In some implementations, the frequency shift of the space signal away from the carrier frequency is the same in magnitude as the shift of the mark signal above the carrier frequency. In such as case, the space signal may be referred to as having a frequency of $-f_m$, representing a signal having a frequency less than that of the carrier frequency by the magnitude of $f_m$. In many cases, FSK transmissions utilize a voltage-controlled oscillator (VCO) to generate the signals having frequencies $f_1$ and $-f_1$, where the frequency of the oscillator is controlled by the inputted bit signal.

Different FSK techniques can be used to modulate different amounts of input data. For example, in 2-FSK systems, two frequencies are defined (e.g., $f_m$ and $-f_m$) where each frequency represents a different binary value. In 4-FSK systems, four frequencies (e.g., $-f_{m2}, -f_{m1}, f_{m1}, f_{m2}$) are defined where each frequency shift represents a different data value. In this manner 8-FSK, 16-FSK, and the like can be implemented to transmit varying amount of data.

In all FSK transmissions, fast frequency transitions can occur as the input data switches sharply between binary values. As such, an FSK-encoded signal may constitute a large bandwidth signal. To minimize the bandwidth of the encoded signals, some systems utilize a Gaussian filter that may be applied to the signal that is ultimately encoded using FSK techniques. This modulation technique is referred to as GFSK and can be used in conjunction with FSK implementations.

GFSK modulation is generally similar to FSK modulation, except that before the data signals (e.g., having binary values of 0 and 1) are transmitted into the FSK modulator, the data signal is passed through a Gaussian filter. This results in a smoother input signal to the FSK modulator, thereby reducing the resulting bandwidth or spectral width of the modulated signal. GFSK modulation schemes are all forms of continuous-phase frequency shift keying (CPFSK).

The present system provides for the improved demodulation of transmitted signals, such as 2-, 4-, 8-, or other modulo2-FSK or GFSK-modulated signals, minimum shift keying (MSK)-modulated signals, Gaussian minimum shift keying (GMSK)-modulated signals, or offset quadrature phase-shift keying (OQPSK)-modulated signals with minimum additional complexity as compared to conventional demodulation methods such as phase discrimination, energy detection, or frequency modulation (FM) to amplitude conversion.

The present demodulator uses a number of separate programmable estimator or correlator branches. Each estimator is configured to analyze an input signal to detect potential data signals at particular frequencies. The outputs of each estimator are then combined and compared to make a final signal detection determination.

Figure 2:
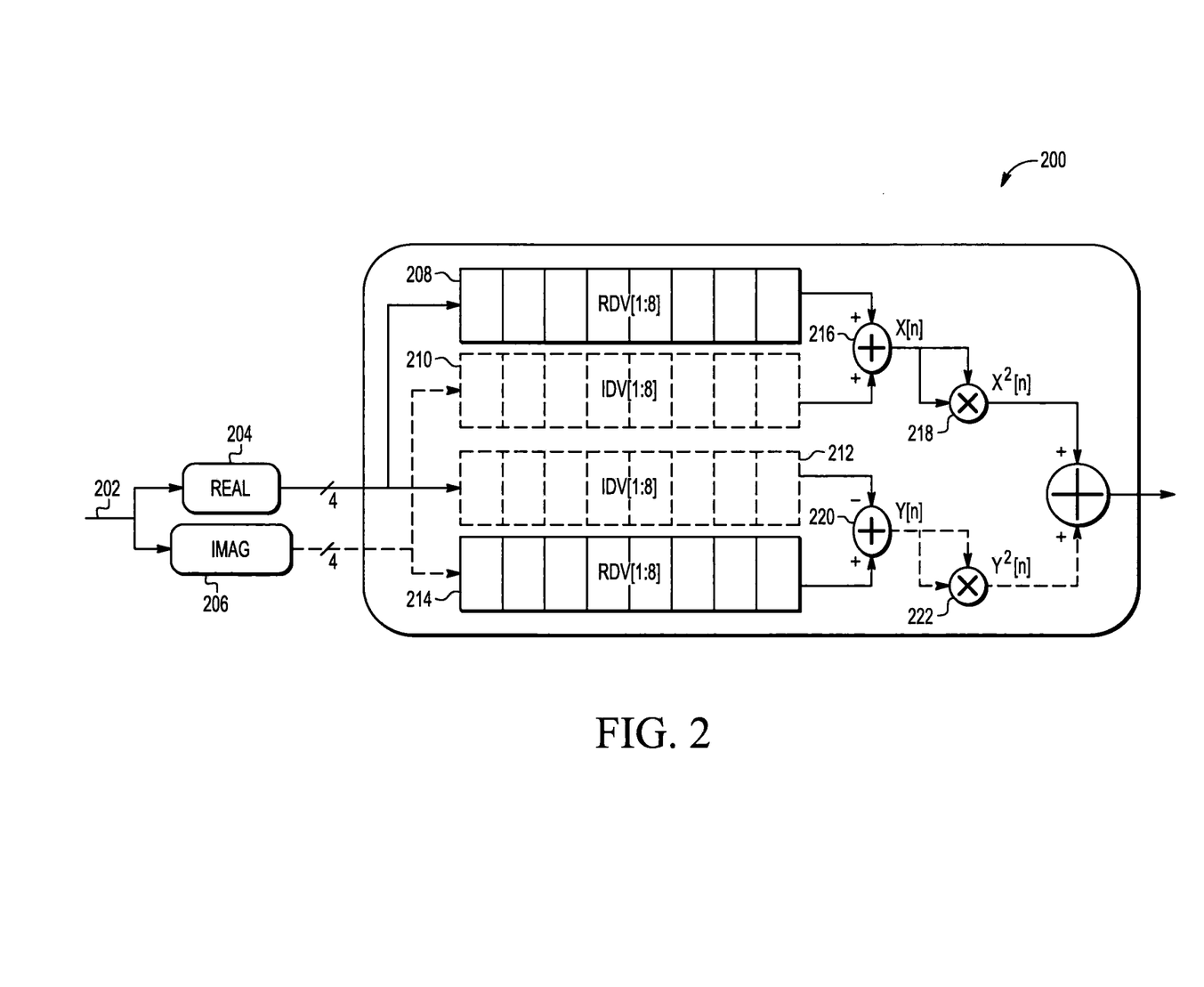
FIG. 2 is a block diagram illustrating an estimator that may be utilized in the present demodulation system.

FIG. 2 is a block diagram illustrating an estimator that may be utilized in the present demodulation system. Estimator 200 includes an input 202 for receiving an input. The input signal is a digital time domain signal (e.g., a signal received from down converter 116 of FIG. 1), potentially containing a modulated data signal made up of one or more data symbols. In one implementation, the data has been modulated using FSK or GFSK modulation techniques. The input signal has a known data rate, such as 1 mega bits per second, at which data symbols have been encoded into the input signal.

After being received at input 202, the input signal is split into real 204 and imaginary 206 components that are then supplied into a number of correlators 208, 210, 212, and 214. The correlators are each configured to analyze their respective input signals in an attempt to detect a signal having a particular frequency, potentially indicating that an FSK or GFSK-encoded signal has been detected. In various implementations, the number of correlators in a particular estimator is selected based upon the desired frequency resolution as well as targeted immunity to interfering radio frequency signals. The real 204 and imaginary 206 components of the input signal may each contain a number of bits of data.

Each of correlators 208, 210, 212, and 214 include a number of taps and may be implemented as finite impulse response filters, where each tap is allocated a particular tap coefficient, where the coefficient represents a digital value. In the present example, 8 taps are used, but depending upon the system implementation any suitable number of taps may be utilized.

Each correlator is configured to process its respective input signal at a particular rate, referred to as the oversampling rate. Oversampling refers to the process of sampling an input signal at a sampling frequency that is significantly higher than the frequency of the input signal. The oversampling ratio is the ratio of the sampling frequency to the signal frequency. Generally, the oversampling ratio at least partially determines the number of taps and corresponding tap coefficients in a given correlator (or, conversely, the number of taps (and, therefore, coefficients) for a particular correlator can determine the oversampling ratio). In the case of 8 taps, an input signal having a known data rate of 1 Mhz would be processed by each correlator at a rate of 8 MHz and an oversampling ratio of 8. This is at least partially achieved by causing each of the taps to delay the input signal by a particular time period as the input signal passes through each tap. In some implementations, the sampling rate of each correlator can be adjusted to determine the number of taps and corresponding tap coefficients. As such, the oversampling ratio and the clock rate at which each correlator operates (determining the sampling rate) can be used to control the frequency resolution of the estimator.

Each one of the 8 taps making up each of correlators 208, 210, 212, and 214 is assigned a particular coefficient. As the input signal passes through each one of correlators 208, 210, 212, and 214, each tap samples the input signal and compares the sampled data signal to that tap's coefficient. Generally, the tap coefficients allocated to the taps of a particular correlator are integer values selected to match the digital values that would be sampled by the taps upon sampling that target signal frequency. Accordingly, if the values of the input signal detected at each of the correlator's taps matches the values specified by the tap coefficients, that indicates that the target signal frequency has been detected. As such, based upon the analysis of the sampled signal to the tap's coefficient, each tap can then generate an output value. For example, the tap may have a high value if the sampled value of the input signal matches the tap's coefficient and a low value otherwise. The outputs of each of the taps are then combined together, as described below, to generate an output of each of correlators 208, 210, 212, and 214 and, eventually, estimator 200. For example, a high value could indicate that the target signal has been detected, while a low value may indicate that the target signal has not been detected.

In the present system, estimator 200 is configured to detect an FSK or GFSK signal transmitted at a particular frequency. When attempting to detect signals having a particular frequency, it is possible to specify the coefficients for each of the taps in each of correlators 208, 210, 212, and 214 that would reflect successful reception of a signal having that particular frequency. In some implementations, the coefficients will be selected to correspond to a single data symbol having been received at a particular frequency. In other implementations, though, a set of coefficients may be defined where the set of coefficients corresponds to the reception of two or more symbols, where the two or more symbols may include whole symbols or partial symbols.

In addition to being configured to detect a particular signal corresponding to one or more data symbols, the coefficients of each of correlators 208, 210, 212, and 214 can also be configured to detect the real or imaginary parts of a particular input signal at a particular frequency. In various implementations, the coefficients allocated to each tap can be adjusted or reprogrammed so that a particular correlator can be modified to detect different signals having different frequencies.

Figure 3A:
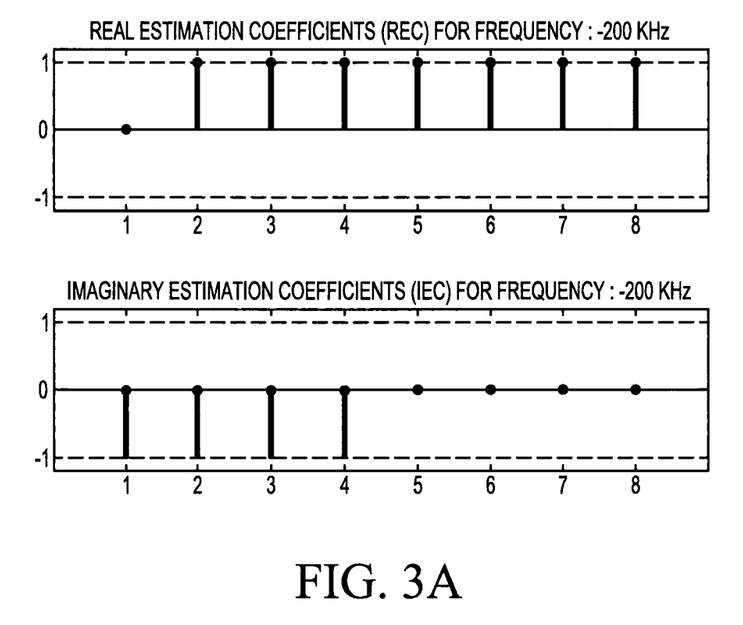
FIGS. 3A-3C illustrate example tap coefficients that may be utilized in a correlator to detect the real or imaginary parts of a particular input signal.

To illustrate the potential tap coefficients for a given correlator, FIG. 3A shows example tap coefficients that may be utilized in correlators 208, 210, 212, and 214 to detect the real or imaginary parts of a symbol of a particular input signal at a FSK or GSFK frequency of −200 KHz. The vertical axis represents the coefficient (ranging from −1 to 1) and the horizontal axis represents the tap number. In a BLUETOOTH configuration, for example, the frequency −200 KHz may be defined as a signal having a frequency of 200 KHz less than the specified carrier frequency. As illustrated, the coefficients can have values of −1, 0, or 1 and a coefficient is defined for each tap. The top row of coefficients is selected for detection of the real portion of an FSK or GFSK-encoded signal at a frequency of −200 KHz, while the bottom row of coefficients is selected for detection of the imaginary portion of an FSK or GFSK-encoded signal at a frequency of −200 KHz.

Although the coefficients illustrated in FIG. 3A only vary between the values of −1, 0, and 1, different sets of coefficients may be specified that provide higher fidelity and can take an increased number of values. For example, the coefficients may vary between the values −3, −2, −1, 0, 1, 2, and 3, or other sets of coefficient values, as needed. As the number of potential coefficient values increases, there is generally a trade-off between the co-efficient bit-width and the frequency-domain resolution of the estimator branches. Generally, the number and quantization of coefficient values (i.e., the number of potential coefficient values) is selected to target a particular frequency resolution capability. In the case of narrowband signals, for example, a higher resolution may be desired in which case the number of potential coefficient values is increased, thereby increasing resolution.

Figure 3B:
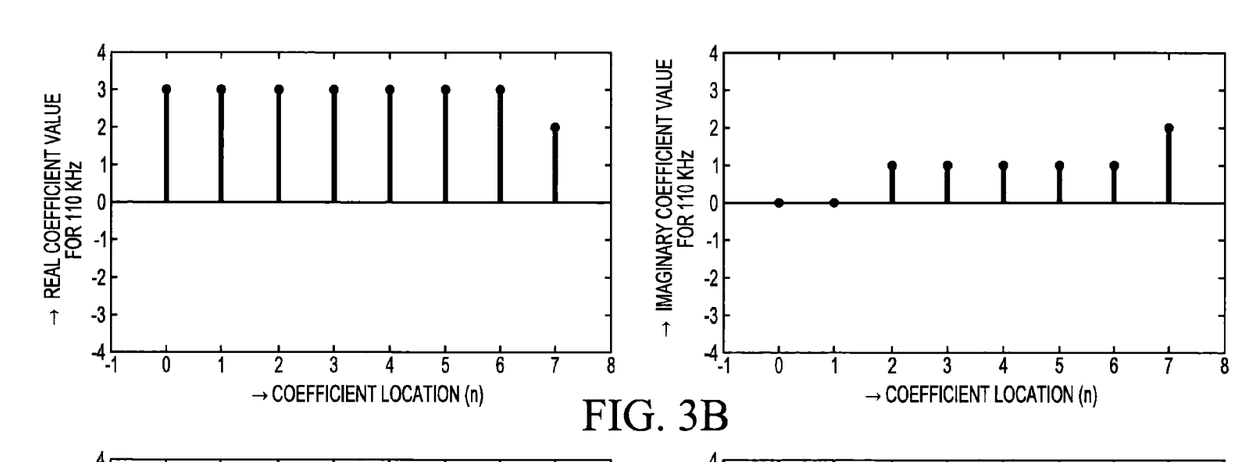

For example, FIG. 3B shows alternative coefficients that may be utilized in correlators 208, 210, 212, and 214 to detect the real or imaginary parts of a particular input signal at a FSK or GSFK frequency of 110 KHz (e.g., having a frequency of 110 KHz above a particular carrier frequency). The vertical axis represents the coefficient (the coefficient values range from −3 to 3) and the horizontal axis represents the tap number. Both the coefficients for detecting the real portion of the signal (on the left) and the coefficients for detecting the imaginary portion of the signal (on the right) vary between −3 and 3.

Figure 3C:
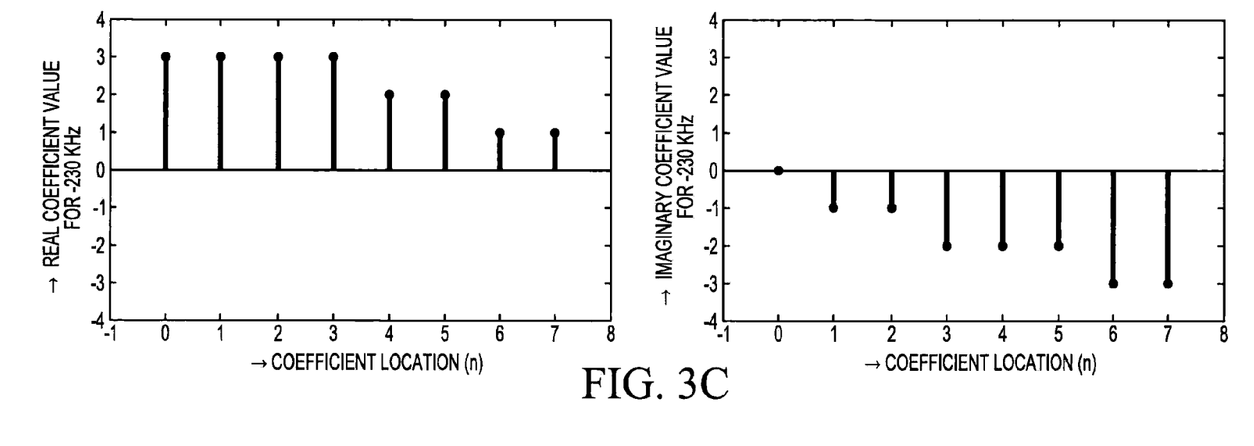

Similarly, FIG. 3C shows alternative coefficients that may be utilized in correlators 208, 210, 212, and 214 to detect the real or imaginary parts of a particular input signal at a FSK or GSFK frequency of −230 KHz (e.g., having a frequency of 230 KHz below a particular carrier frequency). The vertical axis represents the coefficient (the coefficient values range from −3 to 3) and the horizontal axis represents the tap number. Both the coefficients for detecting the real portion of the signal (on the left) and the coefficients for detecting the imaginary portion of the signal (on the right) vary between −3 and 3.

As illustrated by FIGS. 3A-3C, different set of coefficient values can be generated to detect FSK or GFSK-encoded signals at different frequencies. Because each correlator within the present demodulator processes input data at a specific rate, as the target frequency being detected increases, the coefficients change more frequently along the horizontal axis. Conversely, as the target frequency being detected decreases, the coefficients change less frequently along the horizontal axis.

In general, for a given target frequency, the coefficients for a particular correlator are configured to approximate the shape of the waveform that would be observed by the correlator upon receiving a signal at that frequency. Accordingly, as the number of potential coefficients increases, the resolution of the correlators will also increase.

Returning to FIG. 2, coefficients for a particular signal frequency are allocated to each tap in correlators 208, 210, 212, and 214. In various implementations, the correlators may be programmable so that a controller in communication with each of the correlators can specify particular coefficient values. This may be useful, for example, to adjust a correlator to be configured to detect signals having different frequencies, to increase or decrease the resolution of the tap coefficients of a particular correlator, or both. In the present example, correlators 208 and 214 are allocated the coefficients to detect the real portions of the input signal, while correlators 210 and 212 are allocated the coefficients to detect the imaginary portions of the input signal.

As the input signal flows through each of correlators 208, 210, 212, and 214, the taps of each correlator regularly sample the input signal. Each time the input signal is sampled, an array of the data samples generated by each tap is multiplied by an array of the coefficients for each tap. The sum of those multiplications then becomes the output of each correlator.

The outputs of correlators 208 and 210 (representing the real and imaginary components of the real portion 204 of the input signal, respectively) are then summed together at node 216. The output of node 216 is then multiplied with itself at node 218 to generate a value equal to the output of node 216 squared. The outputs of correlators 212 and 214 (representing the real and imaginary components of the imaginary portion 206 of the input signal, respectively) are then summed together at node 220. The output of node 220 is then multiplied with itself at node 222 to generate a value equal to the output of node 220 squared. The outputs of nodes 218 and 222 are then summed together to generate the output of estimator 200. In this implementation, the squaring function provided by nodes 218 and 222 serve the purpose of computing the signal energy for positive or negative frequency deviations. In other implementations, the squaring function of nodes 218 and 222 may be replaced by an approximation or a different non-linear function such as magnitude, magnitude approximation, cube, entropy, etc. that allows for making a reliable decision about the demodulated symbol.

The output of estimator 200 is a high value (e.g., '1') when a signal matching the frequency dictated by the tap coefficients of each of the correlators of estimator 200 has been detected. If no such signal is detected, then the output of estimator 200 is a low value (e.g., '0').

The operation of estimator 200 can be generalized according to the following equations. Assuming that the input signal to estimator 200 is defined as I[n]+jQ[n], where n represents the current time slice of the input signal being analyzed. The output of estimator 200 is defined as E[n]. Given those definitions, the output of estimator 200 is defined as follows:

Equation (1)

$$E[n] = \left( \text{abs}\left( \sum_{m=0}^{N-1} \{(I[m] + jQ[m]) \times (REC[N-1-m] - jIEC[N-1-m])\} \right) \right)^2$$

In equation (1), N is the over sampling rate for the estimator's correlators (e.g., 8), while $j=\sqrt{-1}$. REC refers to the output of the correlators for the real part of the input signal (e.g., correlators 208 and 214), while IEC refers to the output of the correlators for the imaginary part of the input signal (e.g., correlators 210 and 212).

The cross-product in equation (1) can be expanded to generate equation (2):

Equation (2)

$$E[n] = \left( \text{abs}\left( \sum_{m=0}^{N-1} \{I[m] \times REC[N-1-m] + Q[m] \times IEC[N-1-m]\} + jQ[m] \times REC[N-1-m] - I[m] \times IEC[N-1-m] \right) \right)^2$$

Equation (2) is translated into equation (3)

Equation (3)

$$E[n] = \left( \text{abs}\left( \sum_{m=0}^{N-1} \{I[m] \times REC[N-1-m] + Q[m] \times IEC[N-1-m]\} + j\sum_{m=0}^{N-1} j\{Q[m] \times REC[N-1-m] - I[m] \times IEC[N-1-m]\} \right) \right)^2$$

Referring to Equation (3), the value $$\sum_{m=0}^{N-1} \{I[m] \times REC[N-1-m] + Q[m] \times IEC[N-1-m]\}$$

can be summarized as X[n], while the value $$j\sum_{m=0}^{N-1} j\{Q[m] \times REC[N-1-m] - I[m] \times IEC[N-1-m]\}$$

can be summarized as Y[n].

Finally, as shown by the sequence of equations below, equation (3) can be further simplified so that the output of estimator 200 is normalized to $X^2[n]+Y^2[n]$. This result is reflected in the operation of nodes 216, 218, 220, and 222 of estimator 200, as discussed above.

$$E[n] = (\text{abs}(X[n]+jY[n]))^2 = (\sqrt{X^2[n]+Y^2[n]})^2 = X^2[n]+Y^2[n] \quad \text{Equation (4)}$$

Estimator 200 is therefore configured to analyze an input signal and determine whether the real and imaginary components of that input signal include a component having a particular frequency. The frequency being detected is dictated by the arrangement of coefficients in each of the taps making up each correlator of estimator 200 as well as the oversampling rate of each correlator. Accordingly, in modulation/demodulation schemes that encode data in the form of a transmitted signal having a particular frequency, estimator 200 can be used to detect whether a signal having a particular frequency has been received.

As discussed above, in one FSK/GFSK approach, two frequency values (referred to herein as the primary frequencies) are used, one indicating a first value (e.g., a binary value of "1") and another indicating a second value (e.g., a binary value of "0"). By modulating the frequency of a transmitted signal, it is possible to communicate a stream of data.

To demodulate such a signal, therefore, two estimators 200 may be utilized, where one estimator 200 is configured to detect signals having the first frequency, while the second estimator 200 is configured to detect signals having the second frequency. The outputs of the two estimators could then be analyzed to determine which data value was transmitted. In such an arrangement, the sensitivity of the receiving device is determined solely by the device's capability to receive signals at the first and second frequencies.

In the present demodulator, however, it is recognized that when a frequency-modulated signal is transmitted at a first target frequency, additional corresponding signals that are at different frequencies may also be received by the recipient device. The additional signals may be harmonics of the originally-transmitted signal, out-of-band signals, and the like. For example, there are several channels allocated within the industrial, scientific, and medial (ISM) bands to receive signals such as ZigBee (IEEE 802.15.4) and Bluetooth low energy (BTLE) signals (e.g., IEEE 802.15.4 allocates 16 such channels). In a particular communication setup, there is a particular channel of interest, and the other channels are considered out-of-band. Signals communicated via the out-of-band channels occasionally interfere with the channel of interest, especially when they are at relatively close frequencies. Those out-of-band signals can be detected in accordance with the present disclosure. Additionally, in a GFSK-modulated signal, the use of Gaussian modulation may result in the modulated signal including a number of different frequencies.

In a 2-FSK demodulator, for example, there are two primary frequencies ($f_1$ and $-f_1$) corresponding to the binary values 1 and 0, respectively. Accordingly, two estimators may be configured to detect those primary frequencies. These are referred to as frequencies that correspond to the primary frequencies $f_1$ and $-f_1$. But in the present demodulator, additional estimators can be incorporated into a demodulator where the additional estimators are configured to detect the frequencies of other signals that may be received in conjunction with the signals at the primary frequencies. Similarly, in a BLUETOOTH application (in which GFSK modulation is used and transmitted signals can have a variety of different frequencies), a number different estimators can be used in a demodulator to detect signals at each of the different frequencies present within the BLUETOOTH transmissions.

Figure 4:
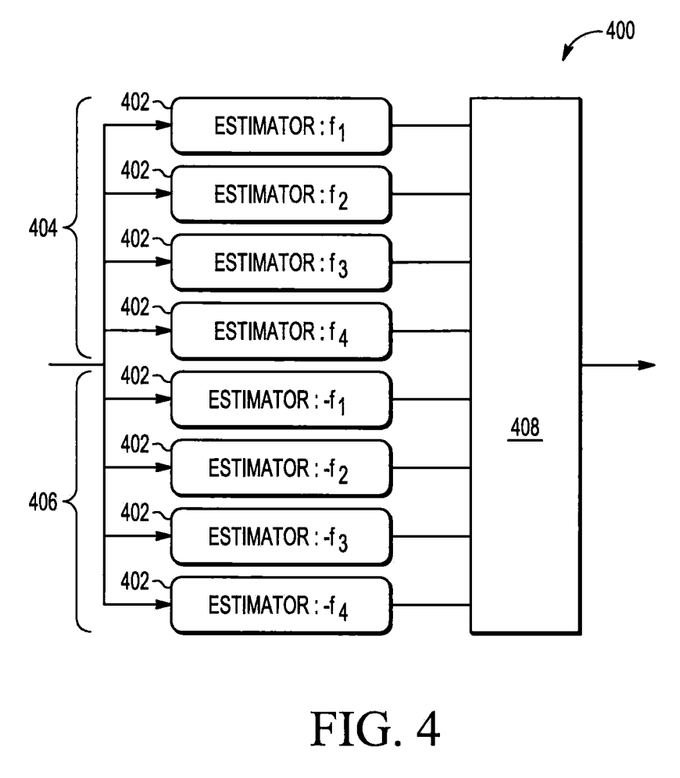
FIG. 4 illustrates a demodulator for a 2-FSK-modulated signal configured in accordance with the present disclosure.

To illustrate, FIG. 4 shows a demodulator for a 2-FSK-modulated signal. Demodulator 400 includes a number of estimators 402. Estimators 402 each receive an input signal that is a time domain signal (e.g., a signal received from down converter 116 of FIG. 1), containing the modulated data signal.

Estimators 402 may be configured in a similar manner as estimator 200 illustrated in FIG. 2. Each estimator is configured to detect an input signal at a particular frequency. This may be achieved, as described above, by configuring the coefficients of the taps of each correlator in each estimator 402 to match a particular input signal frequency.

As shown in FIG. 4, two correlators are configured to detect the primary frequencies of the 2-FSK scheme (i.e., $f_1$ and $-f_1$). However, in demodulator 400 a number of additional estimators are included, where the additional estimators are each configured to detect signals having different frequencies. The additional frequencies $f_2$, $f_3$, and $f_4$ are frequencies that each correspond to the frequency $f_1$. For example, if $f_1$ is 250 KHz, $f_2$, $f_3$, and $f_4$ may be frequencies of signals that happen to be broadcast along with the signal at frequency $f_1$. In one implementation where $f_1$ is approximately 250 KHz, $f_2$ may be approximately 180 KHz, $f_3$ may be approximately 150 KHz, and $f_4$ may be approximately 110 KHz. As such, the detection of signals having any of frequencies $f_2$, $f_3$, or $f_4$ indicates that a signal having frequency $f_1$ has also been transmitted.

In other words, the estimators for frequencies $f_1$, $f_2$, $f_3$, or $f_4$ are configured to detect both the primary positive frequency ($f_1$) of the 2-FSK modulation scheme, as well as the additional frequencies that may also be received when the signal having frequency $f_1$ is transmitted. Similarly, in addition to including an estimator for the frequency $-f_1$, demodulator 400 also includes estimators configured to detect signals that corresponding to frequency $-f_1$, namely $-f_2$, $-f_3$, and $-f_4$.

In some implementations, the positive and negative sets of frequencies will be symmetrical so that each positive frequency is paired with a negative frequency, where the positive and negative frequencies differ from the carrier frequency by the same magnitude. In other implementations, however, the set of positive frequencies will not be symmetrical with the negative frequencies. The magnitudes of the frequencies may differ between positive and negative sets of frequencies. In some implementations, this difference between the positive and the negative sets of chosen frequencies may be exploited to account for a frequency bias in the modulated signal. For example, if the primary frequencies $f_1$ and $-f_1$ are not symmetrical about the carrier frequency, the sets of positive frequencies $f_1$, $f_2$, $f_3$, etc. and negative frequencies $-f_1$, $-f_2$, $-f_3$, etc. may be similarly offset from the carrier frequency to compensate for the resulting frequency bias in the modulated signal. Additionally, the number of frequencies may differ between positive and negative sets of frequencies.

In the case of filtered FSK signals, the choice of the additional frequencies to monitor (e.g., frequencies $f_2$, $f_3$, and $f_4$) may be based upon a characteristic of the frequency distribution of the received modulated signal. For example, for a GFSK modulated signal, the frequency distribution of the Gaussian filter modulated signal or its (first-order or second-order) derivative of the may be used to choose one or more of the estimator frequencies. The $1^{st}$ and $2^{nd}$ derivative of the frequency distribution of a Gaussian filtered modulation signal allows identification of the modulated signal frequencies that have a higher probability of occurrence and/or have a higher rate of change. This information can then be used in making selection of a suitable set of frequency candidates for the demodulation estimators. In other cases, simulations of anticipated transmitter and receiver devices, in conjunction with channel imperfections and interfering signals, can be utilized to generate a number of candidate frequencies that may be utilized in the present demodulator device.

As shown in FIG. 4, the outputs of all of the estimators are received by an output logic block 408, which is configured to analyze the output of estimators 402 and generate a corresponding output signal. Output logic block 408 may implemented using any device, such as an analog circuit, digital circuit, processor, ASIC, and the like, that can analyze the outputs of estimators 402 and apply suitable logic to determine an output value.

In one implementation, output logic block 408 is configured to sum the output of all of the estimators associated with the $f_1$ frequency (i.e., estimators for $f_1$, $f_2$, $f_3$, and $f_4$). Additionally, output logic block 408 sums the outputs of all of the estimators associated with the $-f_1$ frequency (i.e., estimators for $-f_1$, $-f_2$, $-f_3$, and $-f_4$). The summed values are then compared to one another, and the greater of the summed values determines the output of output logic block 408 and, ultimately, demodulator 400. If the sum of the branch of estimators associated with the $f_1$ frequency (illustrated by brace 404) is greater than the branch of estimators associated with the $-f_1$ frequency (illustrated by brace 406), the output of demodulator 400 is a value indicating that a signal having the frequency $f_1$ has been received (e.g., a binary '1'). Conversely, if the sum of the branch of estimators associated with the $-f_1$ frequency (illustrated by brace 406) is greater than the branch of estimators associated with the $f_1$ frequency (illustrated by brace 404), the output of demodulator 400 is a value indicating that a signal having the frequency $-f_1$ has been received (e.g., a binary '0').

In accordance with this disclosure, various demodulators may be developed for different modulation schemes. For example, in 4-FSK modulation, there are four primary frequencies that each correspond to a different value. In that case, a demodulator may be utilized that includes multiple estimators for each of the four potential frequencies. For example, in FIG. 5 demodulator 500 is illustrated. Demodulator 500 includes a number of estimators 502 that may each be configured in a similar manner as estimator 200 illustrated in FIG. 2, where each estimator is configured to detect an input signal at a particular frequency.

Demodulator 500 includes 4 branches 504, 506, 508, and 510. Each branch includes an estimator configured to detect one of the primary frequencies of the 4-FSK modulation scheme (e.g., $f_1$, $f_3$, $-f_r$ and $-f_3$). Each branch also includes a second estimator configured to detect a frequency that corresponds to one of the four primary frequencies (e.g., $f_2$, $f_4$, $-f_2$, and $-f_4$). As such, each branch 504, 506, 508, and 510 includes two estimators configured to analyze one of the four primary frequencies of the 4-FSK modulation scheme (e.g., $f_{m2}$, $f_{m1}$, $-f_{m1}$, $-f_{m2}$). For example, one of the two estimators of each branch may be configured to detect signals having a frequency of $f_{m2}$, while another estimator in the same branch would analyze an intermediate frequency between $f_{m1}$ and $f_{m2}$, which is closer to $f_{m2}$. The outputs of each estimator 502 are then received and analyzed by output logic block 512, which, in turn, generates the output of demodulator 500. In one implementation, output logic block 512 compares the sums of each branch 504, 506, 508, and 510. The output of output logic block 512 and, ultimately, demodulator 500 is then determined by the branch having the greatest value. Although in FIG. 5 only two estimators are shown for each of the primary frequencies of the modulation scheme, more estimators may be used. For example, each branch may include three or more estimators configured to detect signals of particular frequencies.

Using this same approach, demodulators can be constructed n-FSK modulation schemes (e.g., 2-FSK, 4-FSK, 8-FSK, etc.) and Gaussian-filtered versions of the same. The demodulators can include any number of estimators that can be configured to detect the primary frequencies of the modulation scheme, as well as other related frequencies that may be useful in successfully decoding a received signal. Because the estimators are programmable, a single demodulator can be reprogrammed to detect different types of signals. For example, the 2-FSK demodulator depicted in FIG. 4 could be reprogrammed (e.g., by adjusting the coefficients associated with one or more correlator and modifying the operation of output logic block 408) to create the 4-FSK demodulator depicted in FIG. 5.

Figure 5:
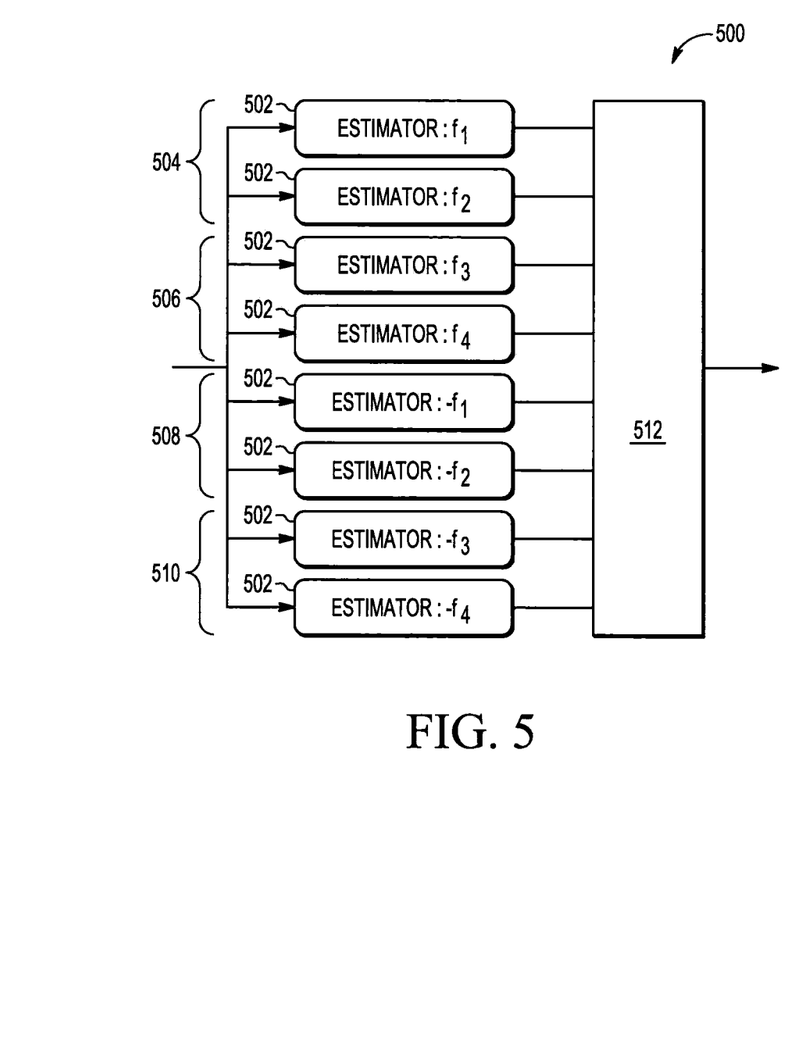
FIG. 5 illustrates a demodulator for a 4-FSK-modulated signal configured in accordance with the present disclosure.

In some implementations, the estimators 402 of demodulator 400 or estimators 502 of demodulator 500 can be configured to detect multiple symbols in a given time slice of an input symbol. Multiple symbol demodulation is a technique that can enable a non-coherent demodulator to achieve the performance of a coherent demodulator for continuous phase modulation (CPM) techniques when the transmission channel's phase response is constant over multiple symbol intervals. Under such stationary channel phase conditions, the multi-symbol demodulator performance can be boosted in one of many ways. For example, performance can be increased by maximizing the posteriori probability of a received symbol sequence given a set of known symbol, and making symbol detection decisions on a block of symbols while accounting for the specific characteristics of a particular modulation and coding/whitening techniques used in a modulation scheme.

In some cases, multiple symbol demodulation techniques are applied to blocks of 3 symbols, in which a demodulator can process a buffer of time domain samples including 3 symbols and make symbol detection decisions on the entire block. In a specific implementation, this set of three symbols might include overlapping blocks, where at each instant the three symbols include a previous, current, and a future symbol. For example, in such a configuration a demodulator/detector can combine features of an energy detector with those of a differential detector. Curve fitting techniques can also be used to make a localized decision on the received symbols for a continuous phase signal due to the inherent symbol shaping via filters in a modulation technique such as a Gaussian filter with known characteristics in Bluetooth-LE modulation.

The present demodulator structure can therefore be extended to accommodate equivalent time domain samples of two or more symbols in each correlator branch. In such a configuration, each correlator would provide at least one output per symbol to the symbol detector block, which can then make symbol identification decision on the block of symbols being processed by the correlators using one of the techniques mentioned above.

To implement multiple symbol demodulation in demodulators 400 and 500, for example, each of the correlators of estimators 402 or 502 would be programmed with a set of coefficients that are configured to match an input signal containing two or more specific symbols or partial symbols. Then, the outputs of each of estimators 402 or 502 can be analyzed to determine whether that particular combination of symbols or partial symbols has been detected.

Figure 6:
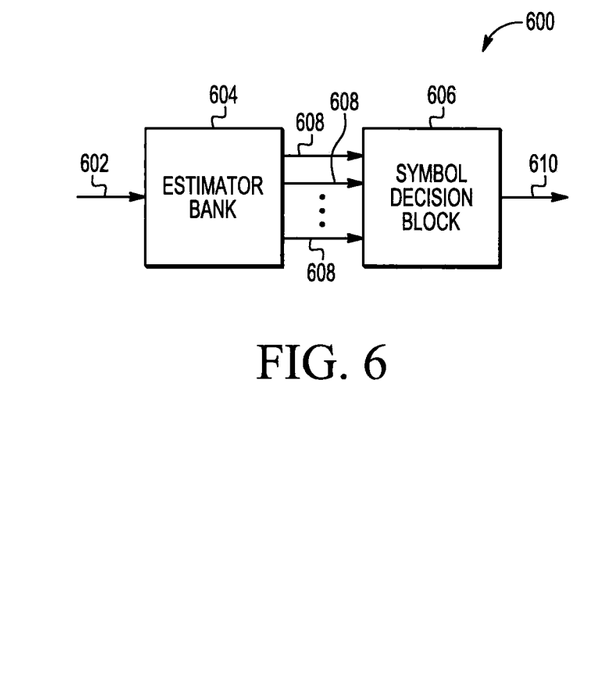
FIG. 6 is a block diagram of a demodulator showing functional components configured to demodulate multiple symbols.

Alternatively, multiple-symbol demodulation can also be implemented by instantiating a set of single symbol demodulators (i.e., containing coefficients configured to match a single symbol) and then using a master decision block that post-processes the output of each single symbol demodulator to make decisions on a block of data. To illustrate, FIG. 6 is a block diagram of demodulator 600 showing functional components configured to demodulate multiple symbols. A digital input signal 602 is provided to estimator bank 604. Estimator bank 604 includes a number of estimators, each configured in accordance with the present disclosure to detect a particular symbol on a particular frequency. For example, for a 3 symbol 2GFSK demodulator, 12 correlation based estimators (4× per symbol, see FIG. 2) can be used. As discussed for the case of a single symbol GFSK demodulator, the use of additional correlators (e.g., 8× per symbol) can result in the demodulator achieving improved demodulation performance, provides better immunity to interfering signals while also enabling 4-GFSK demodulation. The outputs of each of the individual correlators in estimator bank 604 are then transmitted to a symbol decision block 606 (as indicated by the individual arrows 608). Symbol decision block 606 then analyzes the output of each correlator in estimator bank 604 to detect whether a symbol has been detected. If so, symbol decision block 606 generates an output 610 indicating which symbol was detected.

Figure 7:
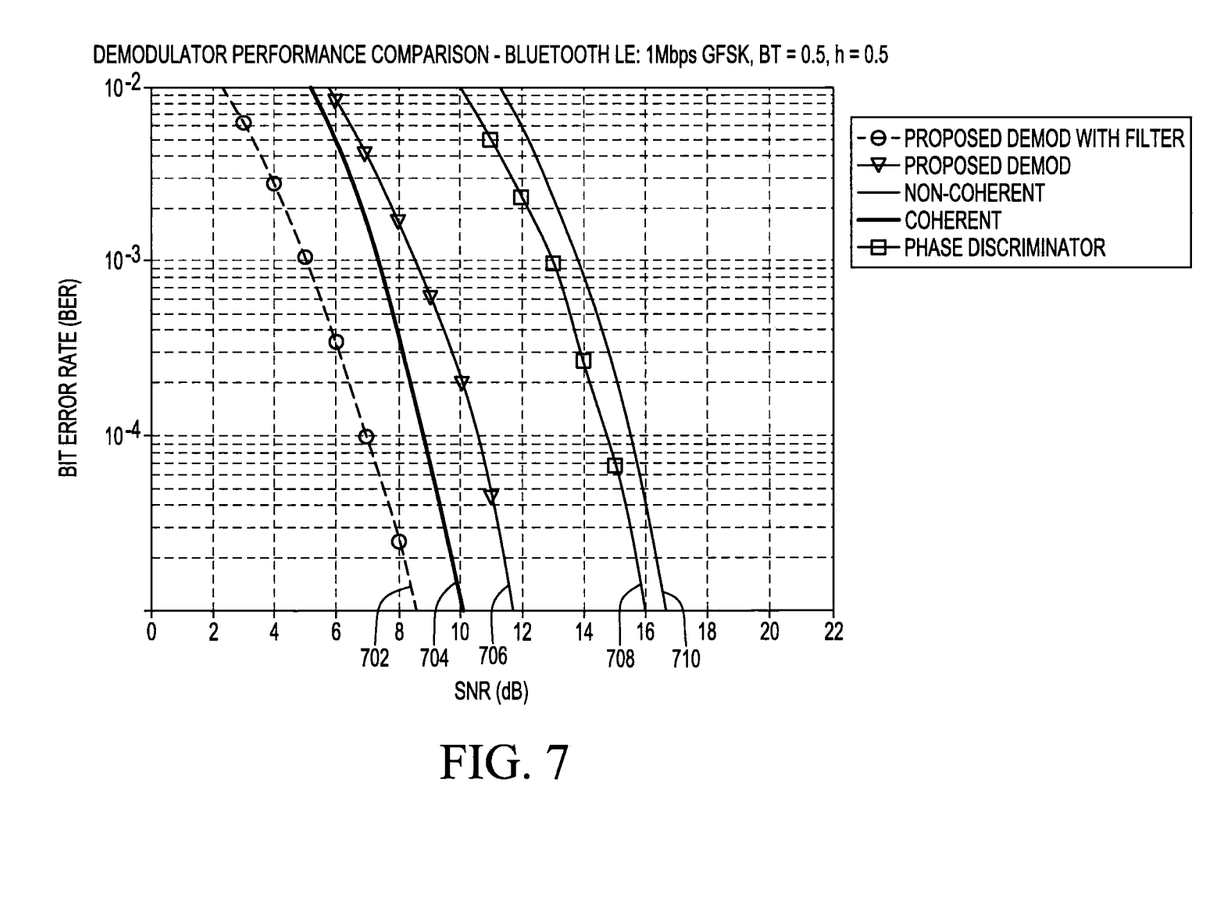
FIG. 7 is a graph depicting simulation results for a demodulator configured in accordance with the present disclosure and conventional demodulators.

As described above, the present demodulation scheme may offer improved performance over other conventional approaches. FIG. 7 is a graph depicting simulation results for a demodulator configured in accordance with the present disclosure and conventional demodulators. In FIG. 7, the horizontal axis represents a signal to noise ratio (SNR) in decibels, while the vertical axis represents the bit error rate (BER).

In FIG. 7, line 702 demonstrates the performance of the present demodulator implemented in combination with a channel filter. Line 704 demonstrates the performance of a conventional coherent demodulator. Line 706 demonstrates the performance of the present demodulator with no channel filter. Line 708 demonstrates the performance of a phase discriminator demodulator. Line 710 demonstrates the performance of a conventional non-coherent demodulator.

As illustrated by FIG. 7, even though the present demodulator is a non-coherent demodulator (that may, in some cases, be suitable for low cost implementations), in one simulation involving the demodulation of BLUETOOTH low energy transmissions in which the present demodulator, without a front-end filter, is operative at an 8 MHz sampling rate, the present demodulator demonstrates an approximately 5 dB improvement in SNR with respect to a conventional non-coherent demodulator and an approximately 4 dB improvement in SNR with respect to a conventional floating point phase discriminator based demodulator for a bit error rate of $10^{-3}$. In fact, in various simulations, the present demodulator can be within 1 dB SNR of Maximum Likelihood Sequence Estimation (MLSE) based coherent demodulator that requires precise knowledge of the initial phase.

In some implementations, the performance of the present demodulator can be improved by limiting the noise that enters the demodulator. As illustrated in the simulation data of FIG. 7, with an 850 kHz channel filter in front of the demodulator, the performance of the present demodulator may be further improved by a factor of 3.5 dB for a BER of $10^{-3}$.

An embodiment of a device in accordance with the present disclosure includes an input configured to receive an input signal. The input signal is modulated by frequency shift keying (FSK) and encodes data at a first frequency and a second frequency. The device includes a first estimator configured to detect a first signal at the first frequency, a second estimator configured to detect a second signal at the second frequency, a third estimator configured to detect a third signal at a third frequency, wherein detection of the third signal is indicative of receipt of the first signal, and a fourth estimator configured to detect a fourth signal at a fourth frequency, wherein detection of the fourth signal is indicative of receipt of the second signal. The device includes an output logic block configured to analyze outputs of the first estimator, the second estimator, the third estimator, and the fourth estimator to generate an output indicating receipt of the data encoded at the first frequency or the second frequency.

An embodiment of a device in accordance with the present disclosure includes an input configured to receive an input signal. The input signal is modulated by frequency shift keying (FSK) and encodes data at a first frequency and a second frequency. The device includes an estimator bank configured to receive the input signal. The estimator bank includes a plurality of estimators. Each estimator is configured to detect a signal at a frequency. The device includes an output logic block configured to generate an output indicating receipt of the data encoded at the first frequency or the second frequency based upon outputs of each of the plurality of estimators.

An embodiment of a method in accordance with the present disclosure includes receiving an input signal. The input signal is modulated by frequency shift keying (FSK) and encodes data at a first frequency and a second frequency. The method includes supplying the input signal to a plurality of estimators. The plurality of estimators include a first estimator configured to detect a first signal at the first frequency, a second estimator configured to detect a second signal at the second frequency, a third estimator configured to detect a third signal at a third frequency, wherein detection of the third signal is indicative of receipt of the first signal, and a fourth estimator configured to detect a fourth signal at a fourth frequency, wherein detection of the fourth signal is indicative of receipt of the second signal. The method includes generating an output indicating receipt of the data encoded at the first frequency or the second frequency based upon outputs of the first estimator, the second estimator, the third estimator, and the fourth estimator.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A device, comprising:
    an input configured to receive an input signal, the input signal being modulated by frequency shift keying (FSK) and encoding data at a first frequency and a second frequency;
    a first estimator configured to detect a first signal at the first frequency;
    a second estimator configured to detect a second signal at the second frequency;
    a third estimator configured to detect a third signal at a third frequency, wherein detection of the third signal is indicative of receipt of the first signal;
    a fourth estimator configured to detect a fourth signal at a fourth frequency, wherein detection of the fourth signal is indicative of receipt of the second signal; and
    an output logic block configured to analyze outputs of the first estimator, the second estimator, the third estimator, and the fourth estimator to generate an output indicating receipt of the data encoded at the first frequency or the second frequency.

2. The device of claim 1, wherein:
    the input signal is modulated by Gaussian frequency shift keying (GFSK) using a Gaussian filter.

3. The device of claim 2, wherein at least one of the third frequency and the fourth frequency is determined by a frequency distribution of the input signal.

4. The device of claim 1, wherein:
    the first frequency and the second frequency are symmetrical about a carrier frequency of the input signal; and
    the third frequency and the fourth frequency are symmetrical about a carrier frequency of the input signal.

5. The device of claim 1, wherein, when the first frequency and the second frequency are not symmetrical about a carrier frequency of the input signal, the third frequency and the fourth frequency are selected to compensate for a frequency bias of the input signal.

6. The device of claim 1, wherein each of the first estimator, second estimator, third estimator, and fourth estimator include a number of finite impulse response filters.

7. The device of claim 6, wherein:
    each of the finite impulse response filters include a number of taps, each tap having a tap coefficient; and
    the number of taps is at least partially determined by an oversampling rate of the device.

8. The device of claim 1, wherein at least one of the first signal, the second signal, the third signal, and the fourth signal includes at least two symbols.

9. The device of claim 1, wherein the output logic block is configured to:
sum the outputs of the first estimator and the third estimator; and
sum the outputs of the second estimator and the fourth estimator.

10. The device of claim 9, wherein the output logic block is configured to compare the sum of the outputs of the first estimator and the third estimator and the sum of the outputs of the second estimator and the fourth estimator to generate the output.

11. A device, comprising:
an input configured to receive an input signal, the input signal being modulated by frequency shift keying (FSK) and encoding data at a first frequency and a second frequency;
an estimator bank configured to receive the input signal, the estimator bank including a plurality of estimators, each estimator being configured to detect a signal at a frequency, the plurality of estimators including:
a first estimator configured to detect a first signal at a third frequency, wherein detection of the first signal is indicative of receipt of the input signal encoding data at the first frequency, and
a second estimator configured to detect a third signal at a fourth frequency, wherein detection of the third signal is indicative of receipt of the input signal encoding data at the second frequency; and
an output logic block configured to generate an output indicating receipt of the data encoded at the first frequency or the second frequency based upon outputs of each of the plurality of estimators.

12. The device of claim 11, wherein the input signal is modulated by Gaussian frequency shift keying (GFSK) using a Gaussian filter.

13. The device of claim 12, wherein the frequency of the signal detected by at least one estimator is determined by a frequency distribution of the input signal.

14. The device of claim 11, wherein each of the plurality of estimators include a finite impulse response filter.

15. The device of claim 14, wherein the finite impulse response filters include a number of taps that is at least partially determined by an oversampling rate of the device.

16. A method, comprising:
receiving an input signal, the input signal being modulated by frequency shift keying (FSK) and encoding data at a first frequency and a second frequency;
supplying the input signal to a plurality of estimators, the plurality of estimators including:
a first estimator configured to detect a first signal at the first frequency;
a second estimator configured to detect a second signal at the second frequency;
a third estimator configured to detect a third signal at a third frequency, wherein detection of the third signal is indicative of receipt of the first signal;
a fourth estimator configured to detect a fourth signal at a fourth frequency, wherein detection of the fourth signal is indicative of receipt of the second signal; and
generating an output indicating receipt of the data encoded at the first frequency or the second frequency based upon outputs of the first estimator, the second estimator, the third estimator, and the fourth estimator.

17. The method of claim 16, wherein generating the output based upon the outputs of the first estimator, the second estimator, the third estimator, and the fourth estimator includes:
combining outputs of the first estimator and third estimator into a first output signal,
combining outputs of the second estimator and fourth estimator into a second output signal, and
generating a data output based upon a comparison of the first output signal to the second output signal.

18. The method of claim 16, wherein at least one of the first signal, the second signal, the third signal, and the fourth signal includes at least two symbols.

19. The method of claim 16, where the input signal is modulated by Gaussian frequency shift keying (GFSK) using a Gaussian filter.

20. The method of claim 19, wherein the frequency of the signal detected by at least one estimator is determined by a frequency distribution of the input signal.

* * * * *